United States Patent [19]

Hoffman

[11] Patent Number: 4,650,731
[45] Date of Patent: Mar. 17, 1987

[54] ELECTRIC CURRENT-PRODUCING CELL AND RELATED COMPOSITION

[75] Inventor: Ronald J. Hoffman, Midland, Mich.

[73] Assignee: The Dow Chemical Company, Midland, Mich.

[21] Appl. No.: 870,196

[22] Filed: Jun. 3, 1986

Related U.S. Application Data

[63] Continuation of Ser. No. 745,981, Jun. 18, 1985, abandoned.

[51] Int. Cl.[4] .................. H01M 4/36; H01M 6/16
[52] U.S. Cl. .................................... 429/112; 423/297; 429/194; 429/218
[58] Field of Search ............... 429/194, 218, 223, 112; 423/287, 297

[56] References Cited

U.S. PATENT DOCUMENTS

| | | | |
|---|---|---|---|
| 4,049,887 | 9/1977 | Whittingham | 429/194 |
| 4,057,679 | 11/1977 | Dey | 429/194 |
| 4,142,028 | 2/1979 | Leger et al. | 429/194 |
| 4,198,476 | 4/1980 | DiSalvo et al. | 429/194 |
| 4,233,375 | 11/1980 | Whittingham et al. | 429/194 |
| 4,288,506 | 9/1981 | Coetzer et al. | 429/223 |
| 4,299,892 | 11/1981 | Dines et al. | 429/194 |
| 4,307,220 | 12/1981 | Lucarelli | 528/128 |
| 4,366,215 | 12/1982 | Coetzer et al. | 429/218 |
| 4,376,709 | 3/1983 | Johnson et al. | 429/218 |

Primary Examiner—Donald L. Walton

[57] ABSTRACT

An electric current-producing cell having an anode, a cathode, and an electrolyte. The anode contains an alkali metal and/or an alkaline earth metal. The cathode contains a transition metal diboride.

15 Claims, 1 Drawing Figure

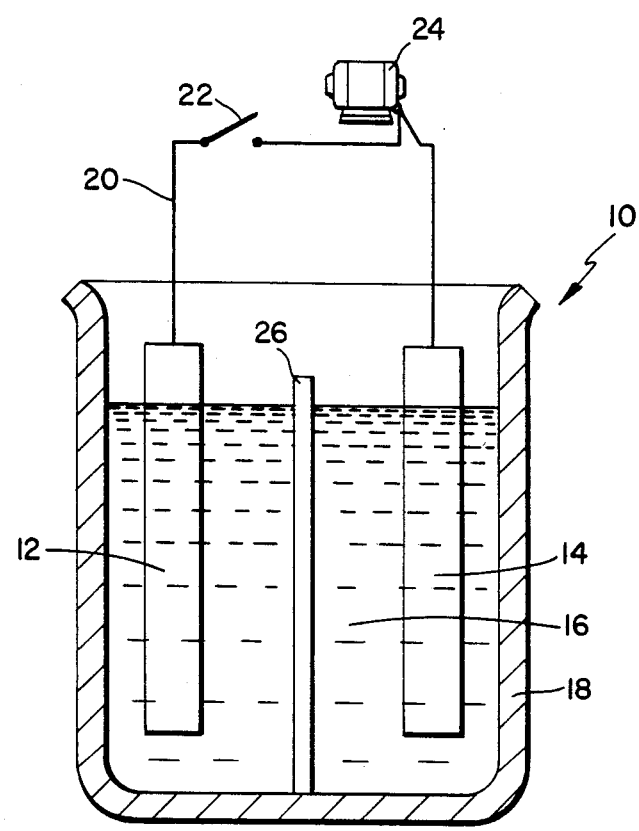

ELECTRIC CURRENT-PRODUCING CELL AND RELATED COMPOSITION

CROSS-REFERENCE TO RELATED APPLICATION

This is a continuation of application Ser. No. 745,981, filed June 18, 1985, now abandoned.

Electric current-producing cells are well-known but in general have insufficient capacity per unit weight. Typical, commercially-available cells have an electrical capacity per unit weight of cathode material less than 250 milliampere hours per gram of cathode material. Attempts by others to increase this capacity have met with only limited success.

Furthermore electrical capacity is directly related to service life. At a given discharge rate the cell having the greater capacity will exhibit greater operating life.

OBJECTS

Accordingly, it is an object of the present invention to provide an improved electric current-producing cell substantially free of one or more of the disadvantages of prior cells.

Another object is to provide a cell having an improved capacity and therefore improved life.

Still another object is to provide an improved cathode material for use in such cells and for other uses.

The above and other objects are accomplished according to the present invention by providing an electric current-producing cell comprising an anode, a cathode, and an electrolyte. The anode has, as its anode-active material, alkali metals and alkaline earth metals. The cathode has transition metal diboride as its cathode-active material. The electrolyte is chemically inert with respect to both the anode and the cathode. The electrolyte permits the migration of ions between the anode and the cathode.

In accordance with the present invention there is also provided transition metal diboride intercalated with alkali metals and alkaline earth metals as a novel composition of matter and as a cathode for use in a cell.

BRIEF DESCRIPTION OF THE DRAWING

The invention is illustrated by the single FIGURE of the drawings which shows a schematic representation of a cell of the present invention.

DESCRIPTION OF PREFERRED EMBODIMENT

Referring now to the drawings there is shown an electric current-producing cell 10 of the present invention. The cell 10 comprises an anode 12, a cathode 14 and an electrolyte 16 within a container 18. The drawing also shows an electric circuit 20 equipped with a switch 22 and a motor 24.

The anode 12 has as its anode-active material an alkali metal or an alkaline earth metal. The cathode 14 is a transition metal diboride. When the cell 10 is discharged the transition metal diboride of the cathode 14 is intercalated with the anode-active material. When the cell 10 is discharged and the switch 22 is closed, current is drawn from the cell 10 causing the motor 24 to turn, increasing the amount of intercalated alkali metal or alkaline earth metal in the cathode 14.

The cell 10 can optionally be equipped with a separator 26.

According to the broadest aspects of the present invention the anode can be any alkali metal and or any alkaline earth metal. Examples of preferable metals to be used as the anode-active material are Li, Na, K, Rb, Cs, Mg and Ca as well as mixtures thereof and alloys thereof.

In accordance with the present invention the cathode-active metal is a transition metal diboride. Examples of suitable transition metal diborides include among others $CrB_2$, $VB_2$, $NbB_2$, $TiB_2$, $TaB_2$, $ZrB_2$, and $MoB_2$.

The electrolyte can be molten or liquid as shown in the drawing. The electrolyte must be chemically inert with respect to both the anode and the cathode. The electrolyte must permit migration of ions between the anode and the cathode.

In an especially preferred embodiment of the present invention the electrolyte includes cations that are common with the material of the anode. Therefore, when the anode contains magnesium, the cation of the electrolyte is magnesium.

In still another preferred embodiment of the present invention the electrolyte includes an ionizable salt represented by the formula M-A wherein M is alkali metal or alkaline earth metal and wherein the anionic moiety is selected from the group consisting of halides, aluminum halides, phosphofluorides, thiocynates, perchlorates, organo borates and organo aluminates.

In certain embodiments of the present invention the electrolyte is non-aqueous, by which is meant that the electrolyte is free of water.

The salt is dissolved in a solvent to form an electrolyte having a specific conductivity of generally from $1.0 \times 10^{-4}$ to $1 \times 10^{-1}$ and preferable from $1.0 \times 10^{-3}$ to $5 \times 10^{-2}$ inverse ohms inverse centimeters.

It is frequently convenient although not required to include complexing agents in the electrolyte. These complexing agents form chemical complexes with the magnesium and/or calcium and increase their solubility. Any complexing agent previously employed in the prior art is suitable. Examples of suitable, complexing agents are the aluminum halides such as $AlCl_3$. The complexing agents are used in an amount to form the desired complex and to increase the solubility to the desired level and generally in a weight ratio of 1:10 to 10:1 based on the weight of the ionizable salt.

When the electrolyte is a solvent solution, a wide variety of solvents can be employed. The preferred solvents are aprotonic, and free of water, and chemically inert with respect to the anode and the cathode, and permit migration of ions between the anode and the cathode.

Examples of suitable solvents include among others propylene carbonate; 1,3-dioxane; dimethyl formamide, dimethyl acetamide, N-methyl pyrrolidone, tetrahydrofuran, 1,2-dimethoxyethane, ethyl ether, and N,N-dimethyl aniline.

In certain embodiments water can be used as the solvent.

The invention may be better understood by reference to the following examples wherein all parts and percentages are by weight unless otherwise indicated. These examples are designed to represent the best mode presently contemplated for carrying out the invention.

EXAMPLE 1

This example is illustrative of the present invention employing magnesium as the anode material and employing a solvent solution as the electrolyte.

A cell is constructed as shown in the drawing wherein the anode 12 is metallic magnesium and wherein the cathode 14 is zirconium diboride.

A solution is created by mixing 116 grams of magnesium perchlorate and 262 grams of $AlCl_3$ in one liter of propylene carbonate to produce an electrolyte useful in the present invention. The electrolyte is placed in the container 18. The switch 22 is closed causing magnesium ions from the solution 16 to intercalate into the zirconium diboride in the cathode 14 thus discharging the cell and causing the motor 24 to run.

This cell has a capacity of approximately 400 milliampere hours per gram of cathode material.

EXAMPLE 2

This example illustrates the practice of the present invention employing calcium.

The procedure of Example 1 is repeated except that the metallic magnesium is replaced by metallic calcium and the magnesium perchlorate is replaced by an equimolar amount of calcium perchlorate.

This cell has a capacity of approximately 400 milliampere hours per gram of cathode material.

The transition metal diboride intercalated with alkali metals and alkaline earth metals according to the present invention is useful not only as an electrode material in accordance with the present invention but also is useful in batteries, in electrochromic displays, as ionic conductors and as inorganic ionic exchangers.

The cells of the present invention can be employed to provide a power source for motors, clocks, radios, and a wide variety of other electrical and electronic devices.

What is claimed is:

1. An electric current producing cell comprising:
   A. an anode having as its anode-active material one or more metals selected from the group consisting of alkali metals and alkaline earth metals; and
   B. a cathode having a transition metal diboride as its cathode-active material; and
   C. an electrolyte which is chemically inert with respect to said anode and said cathode and which permits the migration of ions between said anode and said cathode.

2. The electric current producing cell of claim 1 wherein the anode-active material is selected from the group consisting of Li, Na, K, Rb, Cs, Mg and Ca.

3. The cell of claim 1 wherein the transition metal diboride is selected from the group consisting of $CrB_2$, $VB_2$, $NbB_2$, $TiB_2$, $TaB_2$, $ZrB_2$, and $MoB_2$.

4. The cell of claim 1 wherein the electrolyte is molten.

5. The cell of claim 1 wherein the electrolyte is liquid.

6. The cell of claim 5 wherein the liquid is a solvent solution of ions of the anode material.

7. The cell of claim 6 wherein the solvent is aprotonic.

8. The cell of claim 1 wherein the electrolyte is in contact with both the anode and the cathode.

9. The cell of claim 1 wherein the anode and the cathode are immersed in the electrolyte.

10. The cell of claim 1 wherein the electrolyte is a polar, organic solvent having an ionizable salt dissolved therein, wherein the ionizable salt is represented by the formula M-A wherein "M" means metal and is selected from the group consisting of alkali metals and alkaline earth metals; and wherein "A" means an ion and is an anionic moiety selected from the group consisting of halides, aluminum halides, phosphofluorides, thiocyantes, perchlorates, organo borates, and organo aluminates.

11. An electric current producing cell comprising:
    A. an anode having metallic magnesium as its anode-active material; and
    B. a cathode having zirconium diboride as its cathode-active material; and
    C. an electrolyte which is chemically inert with respect to said anode and said cathode and which permits the migration of magnesium ions between said anode and said cathode.

12. A cathode for a high-capacity, electric current-producing cell, said cathode comprising transition metal diboride intercalated with one or more metals selected from the group consisting of alkali metals and alkaline earth metals.

13. A transition metal diboride intercalated with one or more metals selected from the group consisting of alkali metals and alkaline earth metals.

14. Zirconium diboride intercalated with magnesium.

15. An electric current producing cell comprising:
    A. an anode having a metal selected from the group consisting of magnesium and calcium as its anode-active material; and
    B. a cathode having a transition metal diboride selected from the group consisting of $CrB_2$, $VB_2$, $NbB_2$, $TiB_2$, $TaB_2$, $ZrB_2$, and $MoB_2$, as its cathode-active material; and
    C. an electrolyte which is chemically inert with respect to said anode and said cathode and which permits the migration of ions between said anode and said cathode.

* * * * *